Nov. 8, 1949     E. RECHAIN     2,487,589
ARRANGEMENT OF THE RETRACTABLE FRONT LANDING
GEAR IN AIRCRAFT WITH STRAIGHT TYPE ENGINE
Filed Aug. 17, 1945
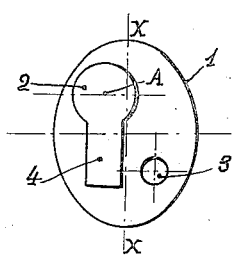
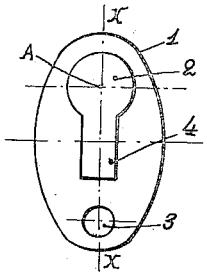
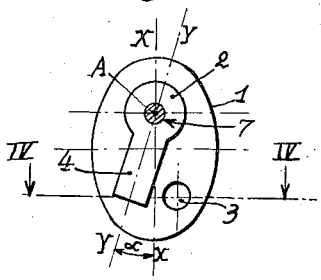
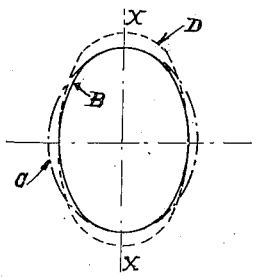
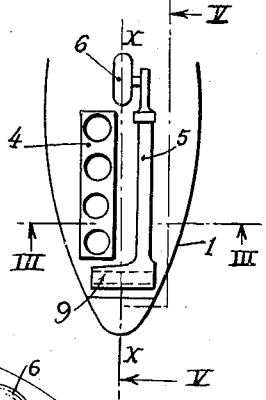
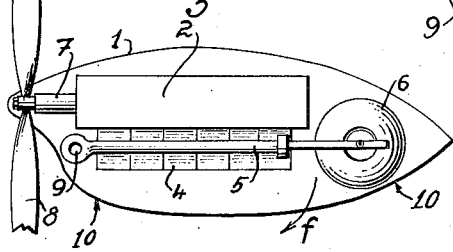
EUGENE RECHAIN
INVENTOR
his ATTY.

Patented Nov. 8, 1949

2,487,589

UNITED STATES PATENT OFFICE 2,487,589

ARRANGEMENT OF THE RETRACTABLE FRONT LANDING GEAR IN AIRCRAFT WITH STRAIGHT TYPE ENGINE

Eugène Rechain, Neuilly-sur-Seine, France, assignor to Societe Nationale de Constructions Aeronautiques Du Nord, Paris, France Application August 17, 1945, Serial No. 611,027
In France September 21, 1943

Section 1, Public Law 690, August 8, 1946
Patent expires September 21, 1963

1 Claim. (Cl. 244—102)

The invention relates to improvements in aircrafts having a straight type engine with the cylinders in line and a tricycle landing gear.

In known aircrafts of this type, the front central motor cowling is used for accommodating the front landing gear in its retracted position, and attempts are made to keep the overall dimensions of the cowling as small as possible. However, the arrangements in present use have the following drawbacks: in a known arrangement, the engine and the landing gear are located side by side in the cowling, whereby the propeller axis and the front landing wheel are no longer in the plane of symmetry of the cowling, whereas the lateral transverse dimensions of the cowling must be enlarged; in another arrangement, the landing gear is located under the engine, which interferes with an easy access to the engine cylinders and the vertical overall size of the cowling must be increased.

This invention has for its object to devise an arrangement by which a straight type engine with a single bank of cylinders in line and a retractable landing gear may be disposed within the cowling, while maintaining the propeller axis and the landing wheel in the plane of symmetry of the cowling, providing for an easy access to the engine cylinders and keeping the overall size of the cowling, both in height and width, to a minimum.

For this purpose, and according to the invention, the engine is so arranged in the cowling that the propeller axis is located in the plane of symmetry of the cowling, while the plane of the axes of the cylinders is inclined to the right or to the left by an angle $\alpha$ with respect to the plane of symmetry of the cowling, and the front landing gear is disposed laterally of the cylinder bank in such manner that the middle vertical plane of the wheel coincides with the plane of symmetry of the cowling.

In the accompanying drawing:

Figs. 1 and 2 are diagrammatic showings of arrangements in present use;

Fig. 3 is a diagrammatic transverse section along the line III—III of Fig. 4 showing an embodiment of the invention;

Fig. 4 is a diagrammatic plan section along the line IV—IV of Fig. 3;

Fig. 5 is a diagrammatic longitudinal section along the line V—V of Fig. 3 and

Fig. 6 is a comparative diagrammatic showing of the cowling girth corresponding to the arrangements shown in Figs. 1, 2 and 3, respectively.

Referring to Fig. 1, which shows diagrammatically an arrangement in present use, 1 denotes the cowling, 2 the engine which comprises a single bank or block of cylinders in line and 3 the wheel supporting member of the landing gear. The engine 2 is set off laterally from the plane of symmetry X—X of the cowling 1, while the landing gear member 3 is arranged laterally of the cylinder block 4 and on the other side of plane X—X. In this arrangement, the propeller axis A and the landing gear member together with the wheel are offset on both sides of the plane of symmetry X—X. This causes an objectionable dissymmetry and further calls for the necessity to increase the width of the cowling without any possibility of reducing the height thereof as compared with a cowling for an engine alone. The overall transverse size of the cowling and the subsequent drag are therefore appreciably increased.

In the known arrangement of Fig. 2, the landing gear member 3 is located under the cylinder block 4, so that the symmetry is preserved; however, this arrangement interferes with an easy access to the cylinders 4 for repairs and calls for an increase in height of the transverse size of the cowling, as compared with the height of the cowling for an engine alone, without permitting to decrease the width. The overall transverse size of the cowling and subsequent drag are therefore again increased in this case.

In Figs. 3 to 5 which show an arrangement according to the invention, the common axis A of the engine crankshaft 7 and of the propeller 8, operatively connected to said crankshaft, is located in the plane of symmetry X—X of the cowling but the longitudinal plane of symmetry Y—Y of the single bank of cylinders in line is inclined by an angle $\alpha$ with respect to the plane X—X. This arrangement increases the available space left free within cowling 1 on the side of the cylinder block 4, which permits of accommodating the landing gear member 3. This landing gear comprises a beam 5 carrying the wheel 6 and swinging about a fixed shaft 9. Into the landing position the beam 5 pivots about the shaft 9 following the arrow $f$ and passing through an aperture 10 provided in the cowling 1. In the retracted position shown in Figs. 3 to 5 the beam 5 is arranged along block 4 while the wheel 6 is located at the end of the block with its vertical middle plane of symmetry in coincidence with the plane of symmetry X—X of the cowling.

Due to this arrangement, no objectionable dissymmetry is produced, the access to the cylinders is easy and the overall size of the cowling is substantially the same as for an engine alone.

Fig. 5 shows the transverse section of the cowling corresponding to the arrangement according to the invention (curve B) to the known arrangement of Fig. 1 (curve C) and to the known arrangement of Fig. 2 (curve D). It will be seen that the transverse overall size of the cowling is a minimum for the arrangement according to the invention.

Having now described my invention, what I claim as new and desire to secure by Letters Patent is:

In an aircraft, an engine cowling, a straight-type engine with a single bank of aligned cylinders arranged in said cowling, a propeller, a crankshaft operatively connecting said engine to said propeller, the common axis of said propeller and crankshaft lying in the longitudinal vertical plane of symmetry of said cowling, whereas the plane of symmetry of said single bank of cylinders is inclined relatively to the plane of symmetry of said cowling, and a retractable front landing gear adapted to enter the cowling in the retracted position and comprising a front wheel and a swinging member carrying said wheel, said landing gear being so arranged that the front wheel carrying member is adapted to be lodged, when retracted, alongside said bank of cylinders, whereas the middle vertical plane of said front wheel which is then entirely located in said cowling coincides with the plane of symmetry of said cowling.

EUGÈNE RECHAIN.

REFERENCES CITED

The following references are of record in the file of this patent:

UNITED STATES PATENTS

| Number | Name | Date |
| --- | --- | --- |
| 2,284,473 | Menasco et al. | May 26, 1942 |

OTHER REFERENCES

Jane's "All The World's Aircraft," 1939, page 282 c.